United States Patent
Waller

(10) Patent No.: US 9,395,017 B2
(45) Date of Patent: Jul. 19, 2016

(54) FLUID VALVE ASSEMBLY

(71) Applicant: Bradley Waller, Deer Park, TX (US)

(72) Inventor: Bradley Waller, Deer Park, TX (US)

(*) Notice: Subject to any disclaimer, the term of this patent is extended or adjusted under 35 U.S.C. 154(b) by 65 days.

(21) Appl. No.: 14/458,367

(22) Filed: Aug. 13, 2014

(65) Prior Publication Data
US 2016/0047485 A1 Feb. 18, 2016

(51) Int. Cl.
*F16K 31/62* (2006.01)
*G05G 1/44* (2008.04)

(52) U.S. Cl.
CPC . *F16K 31/62* (2013.01); *G05G 1/44* (2013.01)

(58) Field of Classification Search
CPC .................................. F16K 31/62; G05G 1/44
USPC ................. 251/236, 242, 243; 4/308
See application file for complete search history.

(56) References Cited

U.S. PATENT DOCUMENTS

| | | | |
|---|---|---|---|
| 624,176 A * | 5/1899 | Chisholm | 4/653 |
| 1,131,570 A * | 3/1915 | Taylor | 4/308 |
| 1,093,452 A | 4/1915 | Metcalf | |
| 1,627,020 A | 5/1927 | Dougherty | |
| 1,779,064 A * | 10/1930 | Gohring | 137/362 |
| 3,489,390 A * | 1/1970 | Cadogan | 251/295 |
| 5,125,623 A | 6/1992 | Kiedinger | |
| 5,199,119 A | 4/1993 | Weber | |
| D354,797 S | 1/1995 | Delable | |
| 5,941,504 A | 8/1999 | Toma et al. | |
| 6,279,508 B1 * | 8/2001 | Marchant et al. | 119/75 |
| 6,446,281 B1 | 9/2002 | Kim | |
| 6,494,345 B2 * | 12/2002 | Schrader | 222/179 |
| 6,722,623 B1 * | 4/2004 | Chen | 251/66 |
| 2005/0236600 A1 * | 10/2005 | Chien et al. | 251/337 |
| 2008/0072970 A1 * | 3/2008 | Gasser et al. | 137/467.5 |
| 2009/0216189 A1 * | 8/2009 | Gasser et al. | 604/119 |

FOREIGN PATENT DOCUMENTS

CA 2367896 5/2003

* cited by examiner

*Primary Examiner* — Matthew W Jellett

(57) ABSTRACT

A fluid valve assembly includes a housing that may be positioned on a support surface. An inlet is coupled to the housing. The inlet may be coupled to a fluid source. A valve is coupled to the housing. The valve is coupled to the inlet. The valve may selectively allow and restrict a flow of fluid from the inlet. A pedal is movably coupled to the housing. The pedal may be stepped on. A switch is coupled to the pedal. The switch engages the valve when the pedal is stepped on. The switch opens the valve. An outlet is coupled to the housing. The outlet is coupled between the valve and a hose. A fluid is delivered to the hose when the pedal is stepped on.

9 Claims, 3 Drawing Sheets

FLUID VALVE ASSEMBLY

BACKGROUND OF THE DISCLOSURE

Field of the Disclosure

The disclosure relates to valve devices and more particularly pertains to a new valve device for opening the valve by stepping on a switch.

SUMMARY OF THE DISCLOSURE

An embodiment of the disclosure meets the needs presented above by generally comprising a housing that may be positioned on a support surface. An inlet is coupled to the housing. The inlet may be coupled to a fluid source. A valve is coupled to the housing. The valve is coupled to the inlet. The valve may selectively allow and restrict a flow of fluid from the inlet. A pedal is movably coupled to the housing. The pedal may be stepped on. A switch is coupled to the pedal. The switch engages the valve when the pedal is stepped on. The switch opens the valve. An outlet is coupled to the housing. The outlet is coupled between the valve and a hose. A fluid is delivered to the hose when the pedal is stepped on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
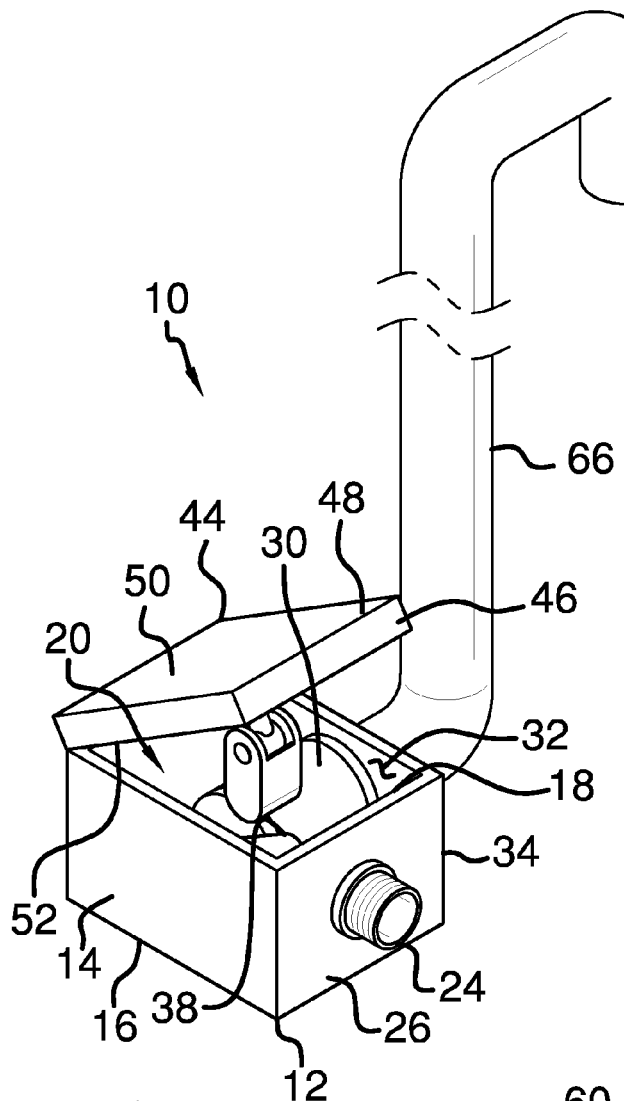
FIG. 1 is a perspective view of a fluid valve assembly according to an embodiment of the disclosure.
Figure 2:
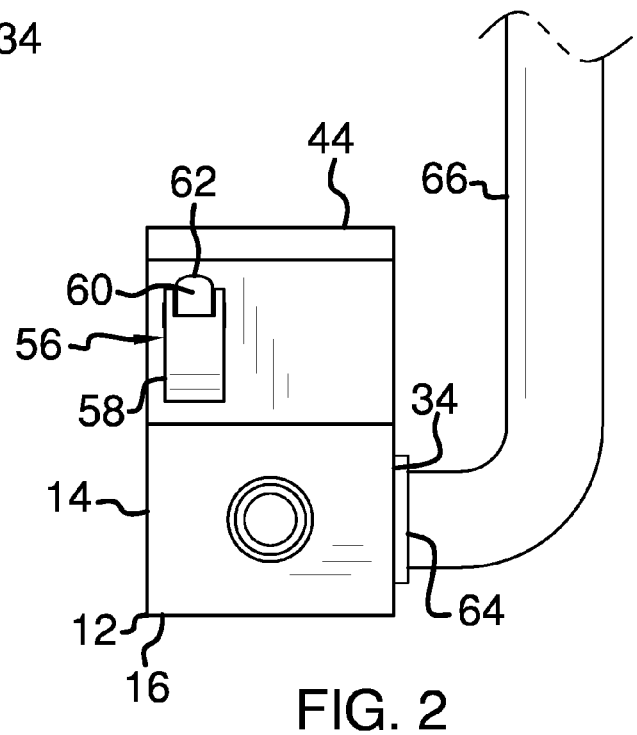
FIG. 2 is a front view of an embodiment of the disclosure.
Figure 3:
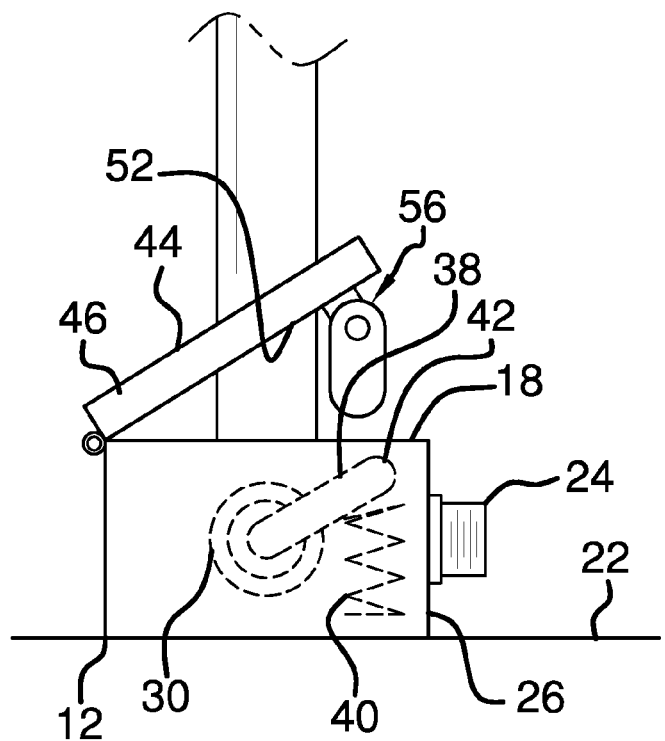
FIG. 3 is a right side view of an embodiment of the disclosure.
Figure 4:
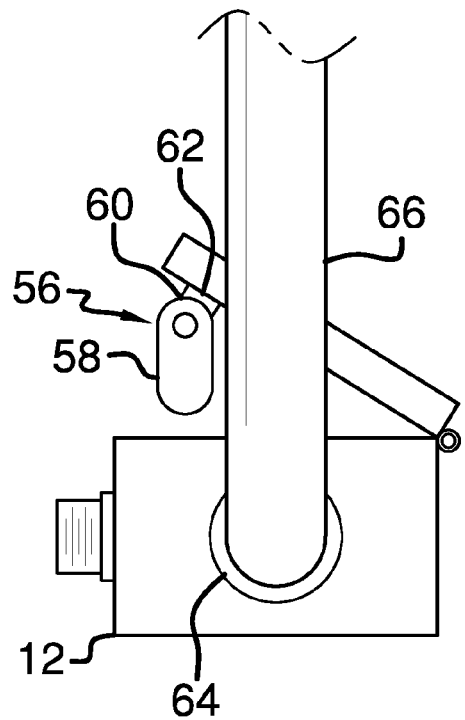
FIG. 4 is a left side view of an embodiment of the disclosure.
Figure 5:
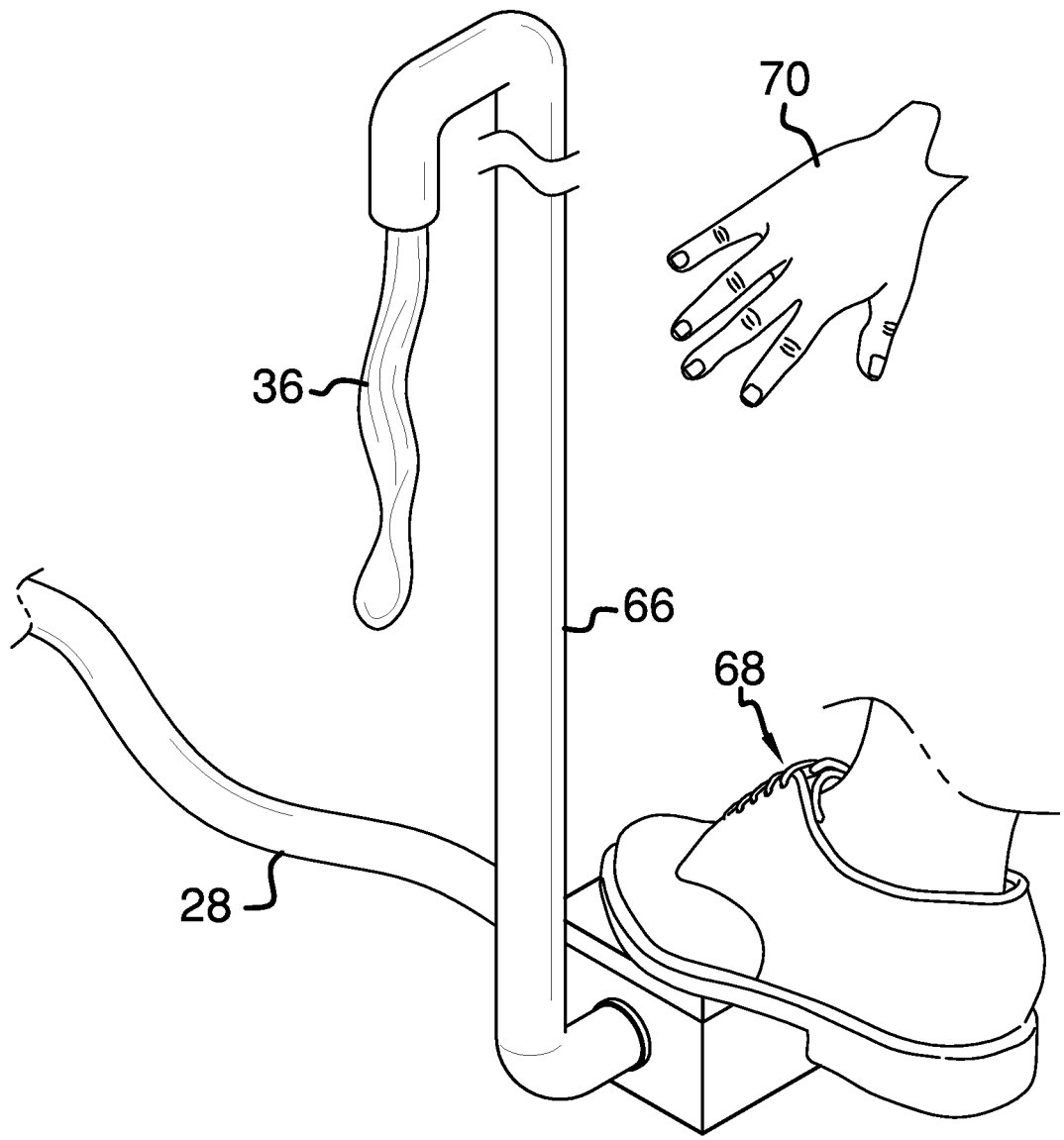
FIG. 5 is an in-use view of an embodiment of the disclosure.

With reference now to the drawings, and in particular to FIGS. 1 through 5 thereof, a new valve device embodying the principles and concepts of an embodiment of the disclosure and generally designated by the reference numeral 10 will be described.

As best illustrated in FIGS. 1 through 5, the fluid valve assembly 10 generally comprises a housing 12. The housing 12 has an outer wall 14 extending upwardly from a bottom wall 16 of the housing 12. A top edge 18 of the outer wall 14 of the housing 12 defines an opening 20 to access an interior of the housing 12. The housing 12 may be positioned on a support surface 22. The support surface 22 may be ground.

An inlet 24 extends through a front side 26 of the outer wall 14 of the housing 12. The inlet 24 is fluidly coupled to a fluid source 28. The fluid source 28 may be a water hose of any conventional design. A valve 30 is coupled to an inner surface 32 of a first lateral side 34 of the outer wall 14 of the housing 12. The valve 30 is fluidly coupled to the inlet 24. The valve 30 may selectively allow and restrict a flow of a fluid 36 from the inlet 24.

A lever 38 is movably coupled to the valve 30. The lever 38 moves the valve 30 between an open position and a closed position. A spring biasing member 40 is positioned between a free end 42 of the lever 38 and the bottom wall 16 of the housing 12. The spring biasing member 40 biases the lever 38 upwardly to position the valve 30 in the closed position.

A pedal 44 is provided. The pedal 44 comprises a lip 46 extending downwardly from an outer edge 48 of an upper side 50 of the pedal 44. The upper side 50 of the pedal 44 may be stepped on. A bottom edge 52 of the lip 46 is hingedly coupled to the top edge 18 of the outer wall 14 of the housing 12. The pedal 44 closes the housing 12 when the pedal 44 is stepped on. Additionally, the pedal 44 is biased upwardly from the housing 12.

A switch 56 is provided. The switch 56 comprises a lower portion 58 of the switch 56 hingedly coupled to an upper portion 60 of the switch 56. An upper end 62 of the upper portion 60 of the switch 56 is coupled to a lower surface 63 of the upper side 50 of the pedal 44. The switch 56 extends downwardly from the pedal 44. The lower portion 58 of the switch 56 engages the lever 38 on the valve 30 when the pedal 44 is stepped upon so the valve 30 is opened.

An outlet 64 extends through the first lateral side 34 of the outer wall 14 of the housing 12. The outlet 64 is fluidly coupled to the valve 30. The outlet 64 is additionally fluidly coupled to a hose 66. The fluid 36 is delivered to the hose 66 when the pedal 44 is stepped on. The fluid 36 may be water.

In use, the pedal 44 is stepped on so a user 68 may wash the user's hands 70 with the hose 66. The assembly 10 prevents the user 68 from touching the valve 30 when the user's hands 70 are dirty. Additionally, the pedal 44 may be stepped on to dispense the fluid 36 for any reason.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fluid valve assembly comprising:
   a housing configured to be positioned on a support surface;
   an inlet coupled to said housing such that said inlet is configured to be coupled to a fluid source;
   a valve coupled to said housing, said valve being coupled to said inlet such that said valve is configured to selectively allow and restrict a flow of fluid from said inlet;
   a pedal movably coupled to said housing such that said pedal is configured to be stepped on;
   a switch coupled to said pedal, said switch engaging said valve when said pedal is stepped on such that said switch opens said valve, said switch comprising a lower portion of said switch movably coupled to an upper portion of said switch, said lower portion of said switch being straight, elongated and having a free end relative to said upper portion of said switch, an upper end of said upper portion of said switch being coupled to a lower surface of an upper side of said pedal such that said switch extends downwardly from said pedal, said free end of said lower portion of said switch being positionable to engage and exert a downward force on a lever on said valve when said pedal is stepped on wherein said valve is opened; and
   an outlet coupled to said housing, said outlet being coupled between said valve and a hose such that a fluid is delivered to the hose when said pedal is stepped on.

2. The fluid valve assembly according to claim 1, further comprising said housing having an outer wall extending upwardly from a bottom wall of said housing, a top edge of said outer wall of said housing defining an opening to access an interior of said housing.

3. The fluid valve assembly according to claim 2, further comprising said inlet extending through a front side of said outer wall of said housing, said inlet being fluidly coupled to the fluid source.

4. The fluid valve assembly according to claim 2, further comprising said valve being coupled to an inner surface of a first lateral side of said outer wall of said housing, said valve being fluidly coupled to said inlet.

5. The fluid valve assembly according to claim 4, further comprising said lever being coupled to said valve such that said lever moves said valve between an open position and a closed position.

6. The fluid valve assembly according to claim 1, further comprising said pedal comprising a lip extending downwardly from an outer edge of an upper side of said pedal.

7. The fluid valve assembly according to claim 6, further comprising a bottom edge of said lip being hingedly coupled to a top edge of an outer wall of said housing such that said pedal closes said housing when said pedal is stepped on, said pedal being biased upwardly from said housing.

8. The fluid valve assembly according to claim 2, further comprising said outlet extending through a first lateral side of said outer wall of said housing, said outlet being fluidly coupled between said valve and the hose.

9. A fluid valve assembly comprising:
   a housing having an outer wall extending upwardly from a bottom wall of said housing, a top edge of said outer wall of said housing defining an opening to access an interior of said housing, said housing being configured to be positioned on a support surface;
   an inlet extending through a front side of said outer wall of said housing, said inlet being fluidly coupled to a fluid source;
   a valve coupled to an inner surface of a first lateral side of said outer wall of said housing, said valve being fluidly coupled to said inlet such that said valve is configured to selectively allow and restrict a flow of fluid from said inlet, said valve having a lever movably coupled to said valve such that said lever moves said valve between an open position and a closed position;
   a pedal, said pedal comprising a lip extending downwardly from an outer edge of an upper side of said pedal such that said pedal is configured to be stepped on, a bottom edge of said lip being hingedly coupled to a top edge of an outer wall of said housing such that said pedal closes said housing when said pedal is stepped on, said pedal being biased upwardly from said housing;
   a switch coupled to said pedal, said switch engaging said valve when said pedal is stepped on such that said switch opens said valve, said switch comprising a lower portion of said switch movably coupled to an upper portion of said switch, said lower portion of said switch being straight, elongated and having a free end relative to said upper portion of said switch, an upper end of said upper portion of said switch being coupled to a lower surface of an upper side of said pedal such that said switch extends downwardly from said pedal, said free end of said lower portion of said switch being positionable to engage and exert a downward force on a lever on said valve when said pedal is stepped on wherein said valve is opened; and
   an outlet extending through a first lateral side of said outer wall of said housing, said outlet being fluidly coupled between said valve and the hose such that a fluid is delivered to the hose when said pedal is stepped on.

\* \* \* \* \*